United States Patent [19]
Zievers et al.

[11] Patent Number: 5,256,175
[45] Date of Patent: Oct. 26, 1993

[54] HOT GAS FILTER

[76] Inventors: James F. Zievers; Elizabeth C. Zievers, both of 1240 Carriage La., LaGrange, Ill. 60525; Paul Eggerstedt, 25054 W. Pauline Dr., Plainfield, Ill. 60544

[21] Appl. No.: 845,627

[22] Filed: Mar. 4, 1992

[51] Int. Cl.$^5$ ............................................. B01D 35/16
[52] U.S. Cl. ............................ 55/302; 55/341.1; 55/378
[58] Field of Search ............ 55/302, 378, 341.1; 210/333.01

[56] References Cited

U.S. PATENT DOCUMENTS

| | | | |
|---|---|---|---|
| 3,615,256 | 10/1971 | Miller et al. | 55/302 |
| 4,525,184 | 6/1985 | Tassicker | 55/302 |
| 4,960,448 | 10/1990 | Zievers | 55/302 |
| 5,073,259 | 12/1991 | Solimar | 55/341.1 |

FOREIGN PATENT DOCUMENTS 2017118 10/1971 Fed. Rep. of Germany ........ 55/302

Primary Examiner—Richard L. Chiesa
Attorney, Agent, or Firm—Patnaude, Videbeck & Marsh

[57] ABSTRACT

A hot gas filter utilizes a plurality of inclined, pie-shaped filter candle support members from which a plurality of filter candles are suspended in a filter chamber within a pressurized filter tank. The support members and associated filter candles are removable from the top of the tank for repair and maintenance, and a plurality of tiers of such assemblies are mounted in the tank.

13 Claims, 5 Drawing Sheets

HOT GAS FILTER

The present invention generally relates to the art of gas filtration, and it relates more specifically to a new improved filter construction which is particularly suited for use in filtering large volumes of corrosive gasses having temperatures of about two thousand degrees Fahrenheit or more.

BACKGROUND OF THE INVENTION

When removing entrained particulates from the gas in which they are entrained it has been the common practice to pass the gas through a porous candle filter element so that the particulate matter is collected on the upstream side of the filter element as the gas passes therethrough. Where flue gasses and the like are filtered., the filter must be able to withstand the high temperatures and corrosive nature of such gasses. It would be desirable to make use of light weight ceramic filter elements and structural materials to provide a filter which is easily assembled and maintained, and which has a particularly large filter surface area for use in filtering large volumes of dirty flue gasses or other high temperature gasses.

SUMMARY OF THE INVENTION

Briefly, there is provided in accordance with the present invention a new and improved pressure filter containing a plurality of independent filter modules which are are pie-shaped and easily mounted in the cylindrical filter chamber of a filter tank. Each filter module includes a candle support member, which includes an outlet gas manifold chamber, and a plurality of filter candles which are suspended from the candle support member. A source of high pressure gas pulses is connected through the candle support member to the interiors of the filter candles for periodically applying pulses of high pressure cleaning gas to the filter candles to momentarily reverse the flow of gas through the filter candles to dislodge particulate matter which had been deposited on the outer surfaces of the filter candles during the filtration cycle. A plurality of the filter modules are mounted in the filter tank in sets or tiers located one above the other to provide a plurality of tiers of candle support members and filter candles. The candle support members of the filter modules slope downwardly toward the central vertical axis of the filter tank at an angle which is equal to or greater than the angle of repose of the particulates entrained in the gas so that the particulates which are deposited on the outer surfaces of the filter candles and which are subsequently dropped onto the next lower candle support member during the reverse flow of gas through the filter candles in the next higher tier, flow freely under the force of gravity toward the central vertical axis of the filter tank.

In a preferred embodiment of the invention, the candle support members are pie-shaped and are supported at their outer ends by shelf brackets mounted to the inner wall of the tank and at their inner ends on a centrally disposed vertical support member or shelf. Sufficient clearance between the modules and the center support member is provided to permit the particulates which drop onto the filter element support members to flow under the force of gravity downwardly along the upper surfaces of the candle support members to the center of the filter tank and down through the clearance spaces between the candle support members and the central support member to the bottom of the tank from which they can be readily removed from the tank in the conventional manner.

The centrally disposed vertical support may be comprised of a number of separate tubes equal in number to the number of filter modules in each set or tier, and the pulses of high pressure cleaning gas are supplied to these tubes and respectively connected to the gas collection manifold chambers in each set through quick connect-disconnect couplings.

In another embodiment of the invention, the pulses of cleaning gas are supplied to the gas collection manifold chambers in each of the filter modules from a plurality of cleaning gas manifolds mounted externally of the filter tank.

BRIEF DESCRIPTION OF THE DRAWINGS

The present invention will be better understood from a reading of the following detailed description taken in connection with the accompanying drawings wherein.

DETAILED DESCRIPTION OF THE PREFERRED EMBODIMENTS

Figure 2:
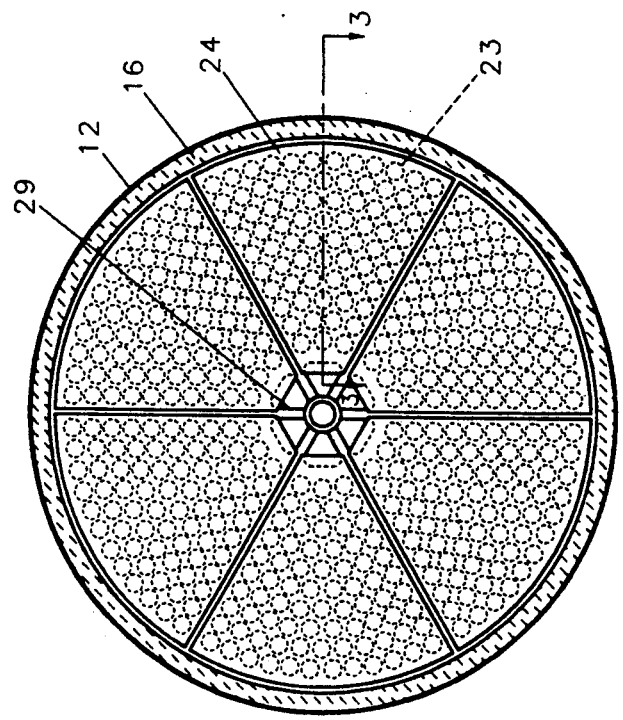
FIG. 2 is a horizontal, cross-sectional view taken along the line 2—2 of FIG. 1.
Figure 1:
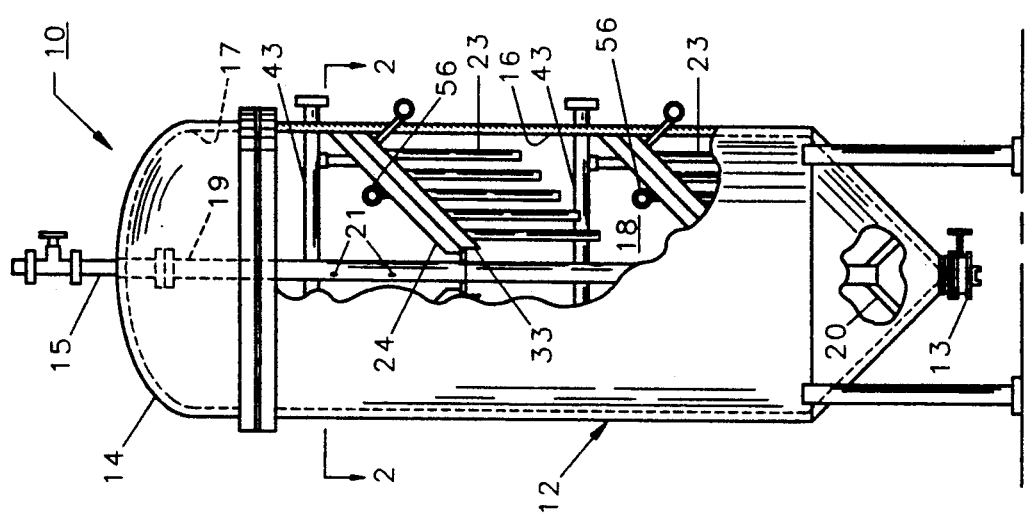
FIG. 1 is an elevational view of a pressure filter embodying the present invention and wherein the tank is partly broken away to show some of the operating parts of the filter mechanism located within the tank.
Figure 3:
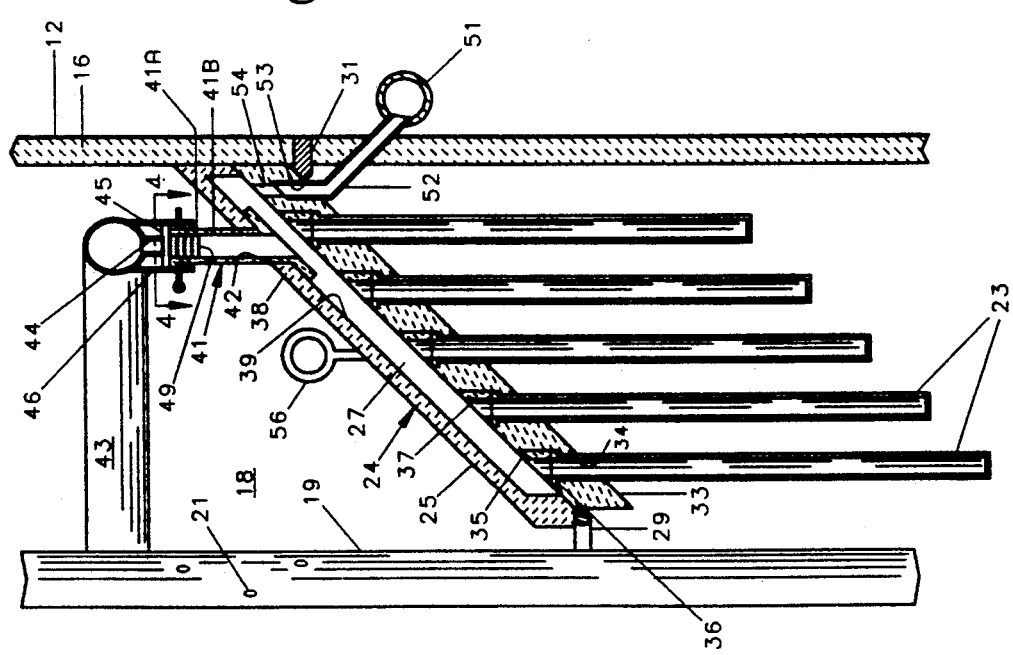
FIG. 3 is a cross-sectional view taken along the line 3—3 of FIG. 2.

Referring particularly to FIGS. 1-3, there is shown a pressure filter 10 which is particularly suited for use in removing particulate matter from hot gasses such as flue gasses where the temperatures normally exceed fifteen hundred degrees Fahrenheit. It should be understood, however, that certain features of the present invention may be used in the filtration of other fluids, such as liquids, and may also be used where the temperatures of the fluids being filtered are at a lesser temperature.

The filter 10 includes a generally cylindrical metal tank 12 having a circular open upper end and a frustoconical lower end having an outlet port 13 at the very bottom through which particulate matter which collects in the bottom of the tank is periodically removed from the tank. A cover 14 is removably and sealably connected in the usual manner to the top of the tank 12 over the open upper end thereof, and a dirty gas inlet port 15 is centrally located in the cover 14. Where the filter 10 is to be used at high temperatures, the tank 12 and the cover 14, which are preferably constructed of steel, are provided with refractory liners 16 and 17 enclosing a filter chamber 18. Centrally mounted within the tank is a tubular support post 19 which is sealably closed at the bottom end and sealably connected at its upper end by suitable quick connect/disconnect means (not shown) to the dirty gas inlet port 15 in the cover 14. The post 19 includes a telescopic connection to permit assembly adn disassembly of the filter and is supported at the bottom by three angularly extending legs 20 which are affixed to the lower portion of the post 19 and which rest on the sloping wall of the tank as shown in FIG. 1. A plurality of through holes 21 are provided in the post 19 for feeding the dirty gas to the filter chamber 18 within the tank 12. If the post is a metallic pipe, it will expand a substantial amount in its longitudinal direction when the filter is put on line and its temperature is substantially increased. Therefore, where the post is formed of metal, a telescoping section can be provided therein to permit such elongation thereof without causing any undue stress or bowing of the post.

In accordance with an important feature of the present invention a plurality of banks or sets of tubular filter elements 23, of the type known as candles, are removably mounted in the chamber 18 in vertically spaced tiers one above the other. Each of the candles 23 is a part of one of a plurality of individual filter modules which as best shown in FIG. 2 respectively include a generally triangular pie-shaped filter element support assembly 24 preferably formed of ceramic, and a plurality of the filter candles 23 which are suspended from an associated one of the filter element support assemblies 24. The filter candles 23 are conventional in that they are generally tubular members formed of a porous material with the lower ends being closed and the upper ends being open. For high temperature applications the filter candles 23 and the filter element support assemblies 24 are preferably formed of ceramic.

As best shown in FIG. 3, each of the filter element support assemblies 24 includes a clean gas outlet manifold chamber 27 which is sealed from the filter chamber 18 in the tank 12 and into which the interiors of the associated filter candles 23 communicate through the open upper ends thereof. In addition, pulses of a high pressure cleaning gas are supplied to the manifold chamber 27 for periodically reversing the flow of gas through the walls of the filter candles to dislodge particulate matter which is deposited on the outer surfaces of the filter candles during the filtration cycle. For this purpose, the manifold chambers 27 in the filter support assemblies 24 are connected to a source of high pressure cleaning gas pulses located externally of the tank 12.

The filter element support assemblies 24 have a flat upper surface 25 which slopes downwardly toward the central vertical axis of the tank 12 at an angle of about forty-five degrees. It is desirable that this angle be equal to or greater than the angle of repose of the particulate matter entrained in the gas being filtered so that the particles will flow freely across the top surfaces 25 of the filter element support assemblies to the center of the tank. For most such particulate matter an angle of forty-five degrees is satisfactory in that any particulates which fall onto the flat upper surface will flow under the force of gravity toward the lower ends of the candle support assemblies.

As shown in FIG. 1, the lower end portions of the filter element support assemblies respectively rest on one of a plurality of generally U-shaped wire shelf brackets 29 affixed to the post 19. The upper end portions of the filter element support assemblies 24 respectively rest on one or more of a plurality of shelf brackets 31 which are affixed to the inner wall of the tank 12 and extend radially therefrom through the refractory liner 16 into the filter chamber 18.

For some applications it is better to slope the modules downwardly toward the wall of the tank to provide a greater spacial area through which the particulates may fall to the bottom of the tank. In those cases the shelf brackets are below the corresponding support brackets 29.

Each of the filter element support assemblies 24 comprises a generally planar support member 33 having a plurality of holes 34 extending therethrough at such an angle that the longitudinal axes thereof lie in the vertical direction when the filter element support assembly is mounted in the tank 12. As may best be seen in FIG. 3, the holes 34 are counterbored as shown at 35 to receive the externally flanged upper ends 36 of the filter candles 23 whereby the filter candles 23 are supported from the tops thereof and depend into the chamber 18. A plurality of hold-down sleeves 37 are positioned in the counterbores 35 above the filter candles 23 and may be cemented to the support member 33 to lock the filter candles 23 in place in the support member 33.

Mounted over the top of the support member 33 and cemented thereto is a cover 38 having a recess 39 in the bottom side thereof which together with the upper surface of the support member 33 defines the outlet gas manifold chamber 27. A clean gas outlet tube 41 opens at its lower end into the chamber 27 and has an annular external flange at it lower end which is positioned within the chamber 27 directly beneath the portion of the cover which surrounds a hole 42 through which the tube 41 extends. Preferably the tube 41 is cemented to the cover 38. The tube 41 comprises upper and lower portions 41a and 41b which are cemented together after the lower portion has been assembled and cemented to the cover 38.

Figure 4:
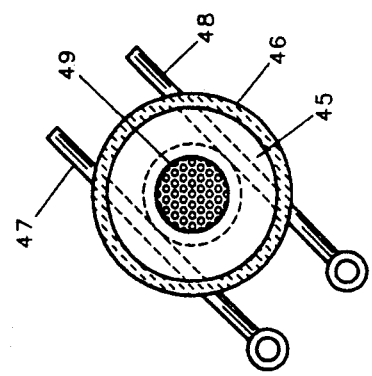
FIG. 4 is a cross-sectional view taken along the line 4—4 of FIG. 3.

A plurality of tubular annular gas outlet manifolds 43 are respectively and removably mounted in the tank 12 above each tier of filter modules and are connected to the individual outlet manifold chambers through the outlet tubes 41 as best shown in FIG. 3. The annular outlet manifolds 43 are connected to a gas outlet port on the outside of the tank. Depending from the manifold tube 43 are a plurality of smaller diameter tubes 44, one for each filter element support assembly, having an external annular flange 45 at the distal lower end. A plurality of outer tubes 46 respectively surround the tubes 44 and are provided with aligned holes for receiving two pins 47 and 48 which extend under the flange at the top of the tube 41 to hold the upper face of the tube 41 tightly against the bottom face of the flange 45. An expandable sealing gasket, not shown, is held in compression between the end faces of the tubes 41 and 44 to seal the interiors thereof from the chamber 18. As further shown in FIG. 4, a plug member 49 having a plurality of small diameter elongate holes extending therethrough is mounted in the upper end of the tube 41 to increase the resistance to the flow of gas to the outlet manifold when the pressure in the manifold chamber 27 is greatly Increased during the introduction of the high pressure pulses of cleaning gas thereto.

An annular tube 51 which conveys high pressure cleaning gas pulses to the manifold chamber 27 surrounds the tank 12 and is connected to each of the manifold chambers 27 in the filter modules by respective ones of a plurality of conduits 52 which extend through the wall of the tank 12 and the liner 16 into the chamber 18. The inner end of each of the conduits 52 is angled upwardly and fits snugly into a counterbore 53 of a through hole 54 which opens into the manifold chamber 27.

It will be seen that the filter modules can be removed from the tank by first disconnecting the tubes 41 from the uppermost outlet manifold 43 and then lifting that manifold 43 from the tank 12. Each filter module in the upper tier can then be lifted from the tank using an overhead hoist. For convenience in lifting the modules from the tank 12, an eyebolt 56 is affixed to each filter element support assembly and extends upwardly from the top thereof. After the top tier of filter modules has thus been lifted out of the tank, the procedure is repeated for the next lower tier with the modules being tilted at a small angle to clear the tubes 52 for the next higher tier of filter segments as the lower modules are being removed.

Figure 5:
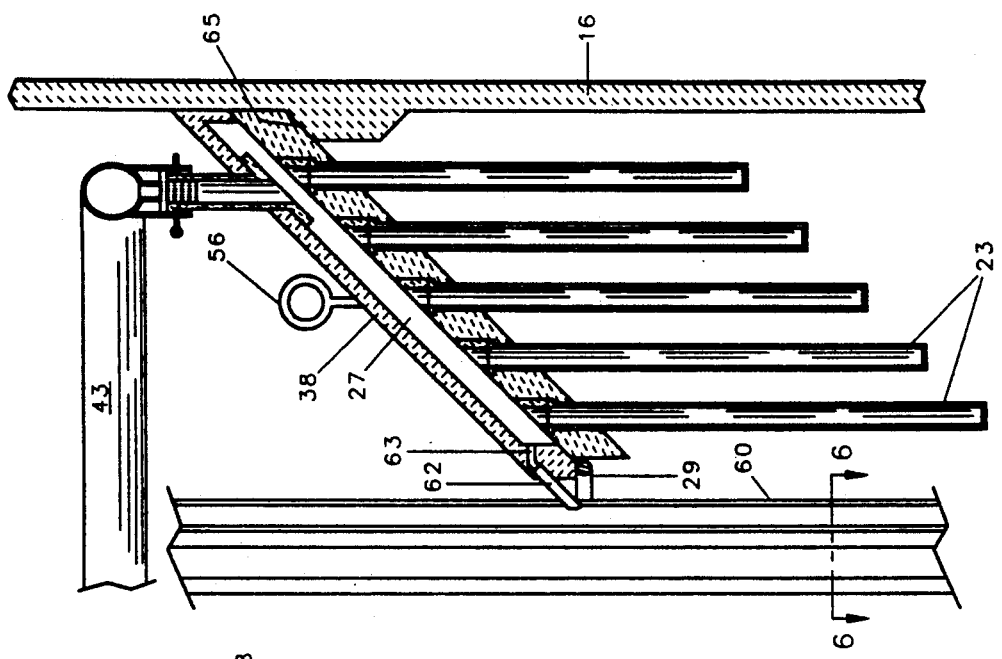
FIG. 5 is a fragmentary, partially cross sectioned view of an alternative embodiment of the invention wherein high pressure pulses of a cleaning gas are supplied to the individual gas outlet manifold chambers through a central disposed, tubular support post.
Figure 6:
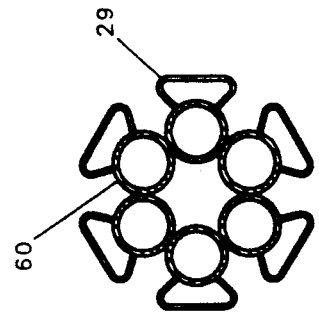
FIG. 6 is a cross-sectional view taken along the line 6—6 of FIG. 5.

Referring to FIGS. 5 and 6, there is shown an alternative embodiment of the invention wherein the outlet manifold chambers 27 in the filter element support assemblies are supplied with the pulses of high pressure cleaning gas through a plurality of rigid tubes 60 which are mounted together along the central vertical axis of the tank 12 and together comprises a central support post assembly from which the lower ends of the filter modules are supported as in the embodiment of FIGS. 1-3.

The tubes 60 are connected to the manifold chambers 27 through the covers 38 by means of a plurality of tubes 62 each having a tapered distal end which tightly fits into the outer end of a through hole 63 in the cover 38. The tube 62 is affixed to the associated one of the tubes 60 and opens into the interior thereof, and the hole 63 opens into the manifold chamber 27. In this embodiment of the invention, the dirty gas is fed to the chamber through an inlet port (not shown) in the cover of the tank. It will also be seen that in this embodiment the outer ends of the filter modules are supported on a ledge 65 which is integral with the refractory liner 16.

Figure 7:
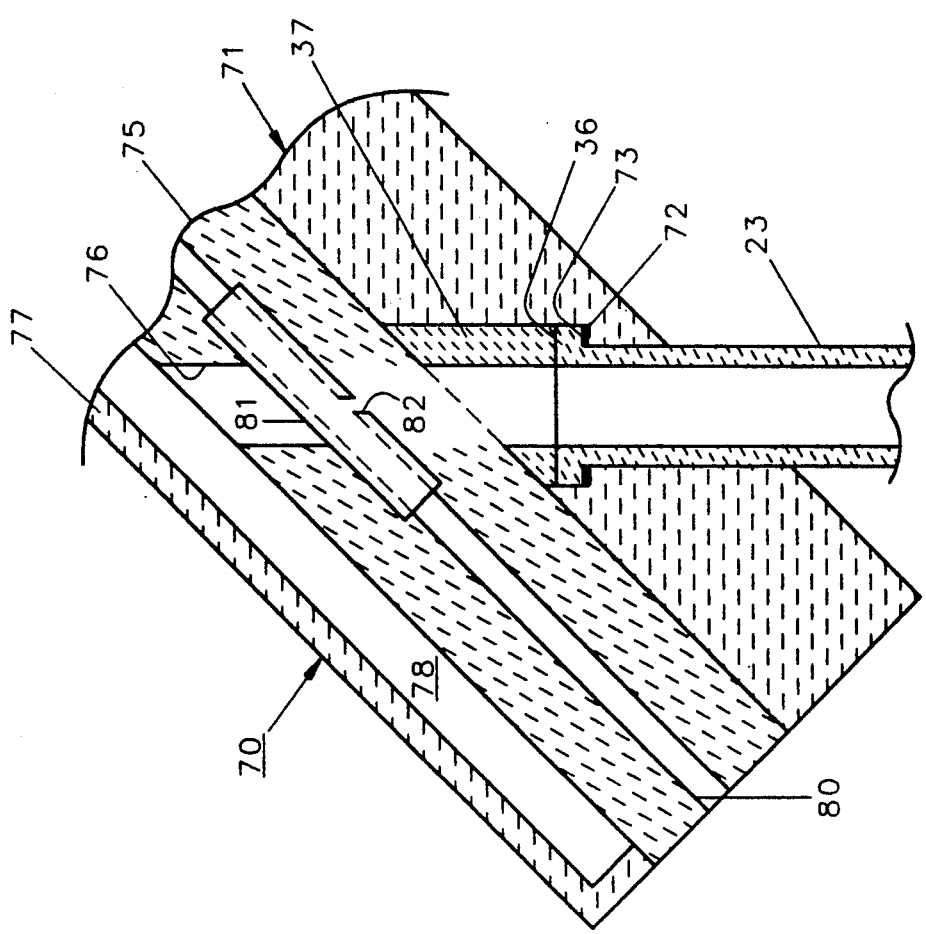
FIG. 7 is a fragmentary, cross-sectional view of a portion of a filter candle support member embodying another aspect of the present invention.

Referring now to FIG. 7 there is shown a portion of a pie-shaped filter module 70 which includes a filter element support member 71 having a plurality of through holes angularly positioned therein to respectively receive a filter candle 23. Only one such hole is visible in FIG. 7, and as shown, it includes a counterbore which defines an annular shoulder 72 against which an annular sealing gasket 73 is held in compression by the flange 36 on the filter candle 23. A tubular spacer 37 is provided for each filter candle 23 and is positioned in the associated counterbore. A hold down plate 75 is positioned over the top surface of the filter element support member 71 and has a plurality of through holes 76 which are aligned with the longitudinal axes of the filter candles 23. A cover member 77 is fitted over the top surface of the bold down member 75 and includes a recess in the bottom thereof which together with the top surface of the hold down member 75 defines a gas outlet manifold chamber 78. The outlet manifold chamber is suitably connected to an external clean gas outlet port. In this embodiment of the invention a plurality of passageways 80 extend through the hold down member and respectively intersect with the holes 76 therein. Tubular nozzle members 81 are tightly fitted into respective ones of the passageways 80 at the locations of the holes 76 and are each provided with an orifice 82 which is located on the longitudinal center line of the associated filter candle 23 and which opens toward the interior of the candle. The high pressure pulses of cleaning gas are supplied to the passageways 80 to cause the pulses of gas to be emitted from the orifices 82 in the form of high pressure jets directed into the filter candles for the most efficient cleaning of the filter candles.

Figure 8:
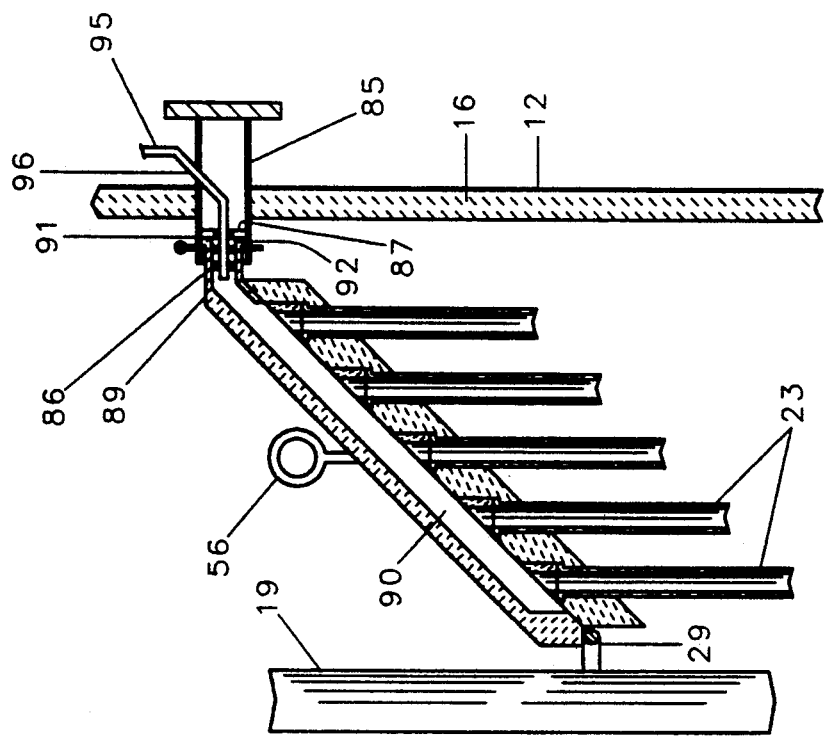
FIG. 8 is a fragmentary cross-sectional view of another embodiment of the invention.

Referring to FIG. 8, there is shown another embodiment of the invention wherein the clean gas from each filter module is fed directly from the gas outlet manifold chamber in the module to an outlet tube 85 which extends through the wall of the filter tank. A flow resistance plug 86 having a plurality of parallel narrow orifices extending therethrough is mounted in the inner end of the outlet tube 85 and includes an annular flange 87 which is sealably fitted into the inner end of the outlet tube. A tubular clean gas outlet port 89 extends from an outlet manifold chamber 90 in the module and has an annular flange 91 at its outer end which is sealably fitted against the flange 86. Preferably, an annular gasket 92 is compressed between the flanges 86 and 91 to seal the outlet port of the module to the outlet tube 85, and a plurality of hold down pins extend through aligned holes in the tube 91 along the sides of the body of the port 89 adjacent to the flange 91. As shown, the plug 86 fits into the end portion of the outlet port 89 and includes a plurality of very small diameter elongate holes which increase the resistance to gas flow through the plug as the velocity of the gas Increases. In this way the high velocity pulses of cleaning gas are prevented from bypassing the filter candles 23 by exiting the filter directly through the outlet port 85.

A narrow, rigid tube 95 extends through a hole 96 in the wall of the tube 85 and is shaped so that the inner end thereof extends along the central longitudinal axis of the tube 85 through the center of the plug 86. A source of high pressure pulses of cleaning gas is connected to the outer end of the tube 95 for supplying high pressure pulses of cleaning gas to the gas outlet manifold chamber 90 in the filter module.

Figure 9:
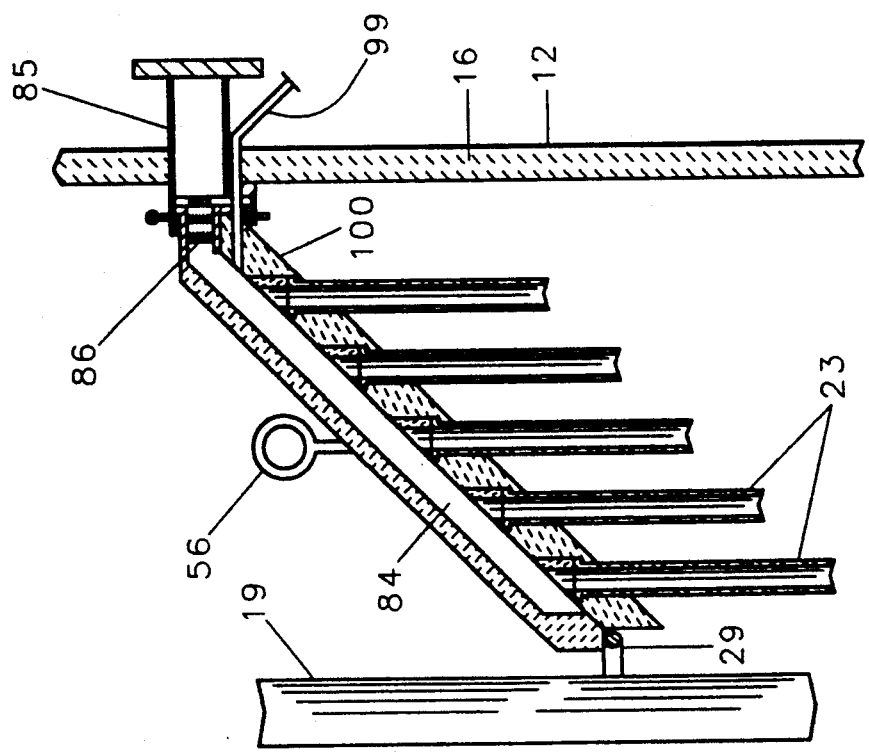
FIG. 9 is a fragmentary cross-sectional view of another embodiment of the invention.

Referring to FIG. 9, it will be seen that the embodiment shown therein is similar to that shown in FIG. 8 except that the pulses of high pressure cleaning gas are supplied to the gas outlet chamber 87 through a tube 99 which extends through the wall of the filter tank through a hole located below the gas outlet tube 85 and through the filter element support member 100 into the chamber 87 upstream of the flow resistance plug 86. Similar parts are identified in FIGS. 8 and 9 by the same reference numbers.

Figure 10:
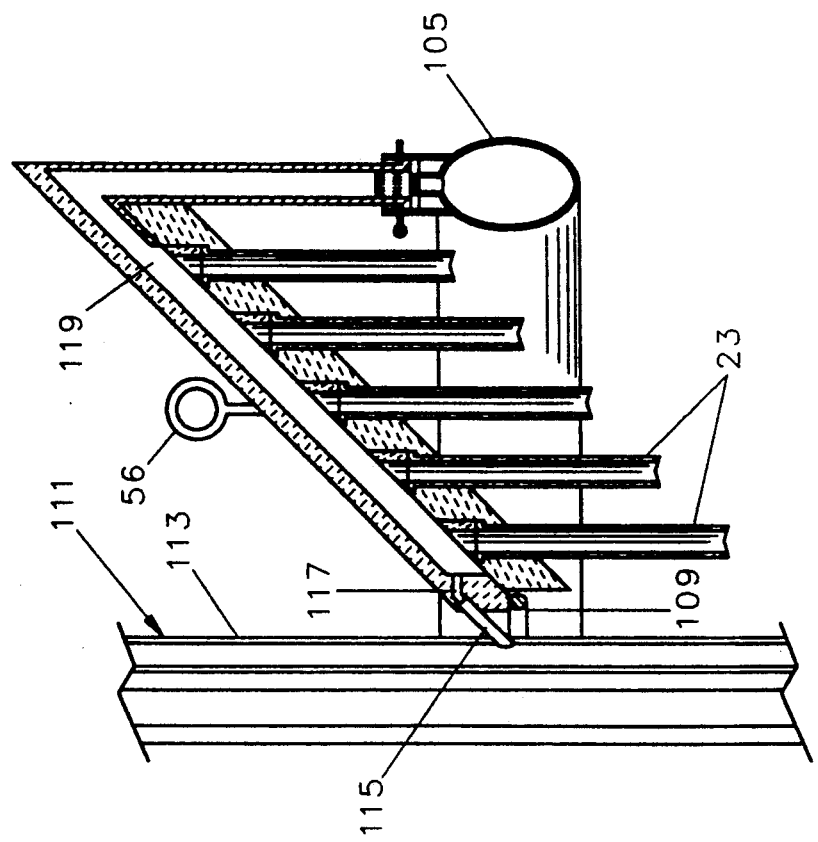
FIG. 10 is a fragmentary cross-sectional view of still another embodiment of the invention.

Referring to FIG. 10, there is shown another embodiment of the invention which is similar to the embodiment shown in FIG. 3, but wherein one of a plurality of annular clean gas outlet manifold tubes 105, which are respectively provided for each tier of a plurality of filter modules, is shown mounted below the associated tier of filter modules. The filter modules are supported at the lower inner ends thereof by wire brackets 109 which are carried by a central support post 111 which is made up of a plurality of jet pulse gas inlet tubes 113 which are respectively connected to one of a plurality of filter modules in each tier by a thin tube 115 which is mounted to the associated gas inlet tube 113 and fits tightly into a hole 117 in the cover of the module and which opens onto a gas outlet chamber 119 within the module.

Figure 11:
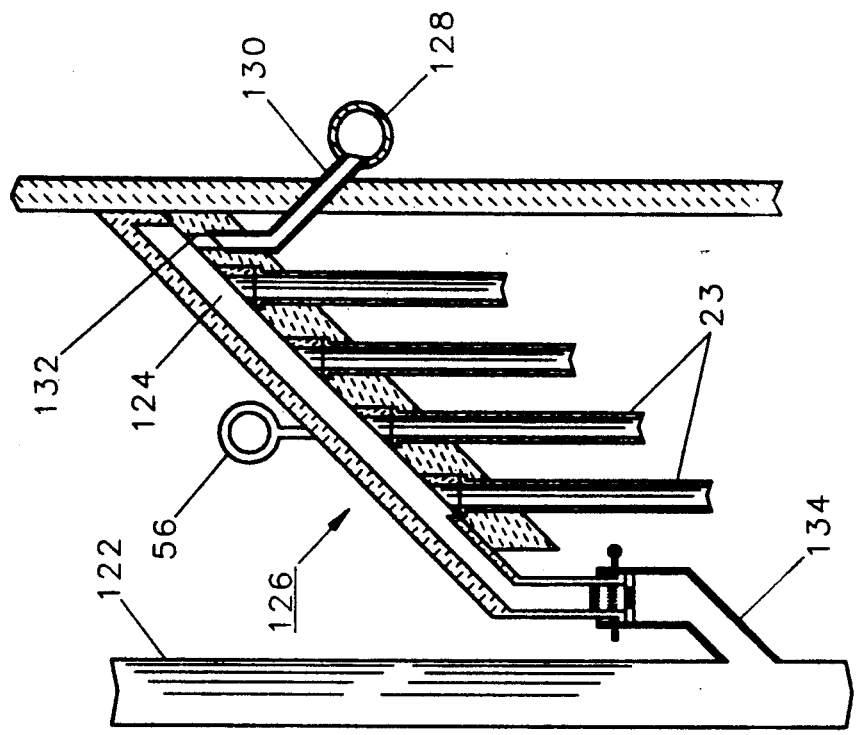
FIG. 11 is a fragmentary cross-sectional view of still another embodiment of the invention.

Referring to FIG. 11, there is shown an embodiment of the invention wherein the central support post 122 is tubular and constitutes the outlet gas manifold to which the outlet manifold chambers 124 in all of the filter modules 126 are connected. In this embodiment of the invention the high pressure cleaning gas pulses are supplied to the outlet manifold chambers from an annular, tubular cleaning gas manifold 128 which surrounds the filter tank and is connected to the respective manifold chambers 124 via tubes 130 which extend through the wall of the tank and are press fitted into holes 132 in the module assemblies. As shown, the inner ends of the modules are supported by the associated one of the outlet tubes 134 which extend from the outlet tube 122 at the center of the tank.

In all of the embodiments of the invention which are described herein it is desirable that the filter modules be constructed of light weight material to facilitate the installation and maintenance of the filters. Where the filters are to be used in high temperature applications, such as in the filtering of flue gasses, it is particularly important that all of the materials located within the filter tanks be able to withstand the high temperatures and corrosive characteristics of the flue gasses. Light weight ceramic elements are particularly suited for such applications.

While certain embodiments of the present invention have been described herein, it will be understood that changes and modifications may be made therein within departing from the true spirit and scope of the invention, and therefore, it is intended by the appended claims to cover all such changes and modifications which fall within the true spirit and scope of the present invention.

What is claimed:

1. A pressure filter, comprising in combination a tank having a generally circular horizontal cross-section
   enclosing a pressurizable filter chamber, gas inlet means for supplying a gas in which particulate
   matter is entrained to said filter chamber, gas outlet means extending through said tank from the
   interior of said tank to the exterior of said tank, first and second sets of filter element support means mounted
   in said tank in vertically spaced mutual relationship, a plurality of generally tubular filter elements each having
   a porous wall for filtering gas passing therethrough, each of said filter elements enclosing an interior chamber such that particulate matter entrained in said gas will be deposited on an outer surface of said filter elements,
   said filter elements being suspended within said filter chamber from said first and second sets of filter element support means,
   means connecting said interior chambers in said filter elements to said gas outlet means,
   each of said filter support elements being generally wedge-shaped and having an outer arcuate peripheral edge, and being interfitted in mutually assembled relationship such that said filter support elements in each of said first and second sets provide an assembly which has a circular outer periphery,
   means for removing said particulate matter from said tank,
   a plurality of cover means disposed below said filter elements supported by said first set of filter element support means and above said second set of filter element support means and having generally planer upper surfaces for intercepting particles falling toward said second set of filter element support means and for directing said particulate matter away from said second set of filter element support means,
   said generally planer upper surfaces sloping downwardly at an angle between the horizontal and the vertical and having an upper edge and a lower edge, said lower edge positioned above said means for removing said particulate matter from said tank, and
   means for dislodging particulate matter from said outer surfaces of said filter elements suspended from said first set of filter element support means to cause said particulate matter dislodged from said filter elements suspended from said first set of filter element support means to fall onto said generally planer upper surfaces,
   whereby particulate matter which drops from the filter elements suspended from said first set of filter element support means and which falls on said generally planer upper surfaces flow downwardly along said upper surfaces toward said lower edge of said upper surfaces.

2. A filter according to claim 1 wherein
   said means for disloding said particulate matter from said filter elements includes means for introducing pulses of a high pressure gas to the interiors of said filter elements and comprises passageway means connected between the interior of a tubular support member and the interiors of said filter elements, and
   means for supplying pulses of said high pressure gas to the interior of said tubular support member.

3. A filter according to claim 1 comprising
   means supportably mounting the peripheral portions of said wedge shaped elements to the wall of said generally cylindrical section of said tank.

4. A filter according to claim 1 comprising
   an annular outlet manifold mounted to said tank,
   an outlet manifold chamber in said second filter element support means sealed from said chamber in said tank and to which the interiors of said filter elements suspended from said second filter element support means are connected, and
   passageway means connecting said annular outlet manifold to said manifold chamber in said second filter element support means.

5. A filter according to claim 4 wherein
   said annular outlet manifold is mounted within said tank.

6. A filter according to claim 5 wherein
   said annular outlet manifold is mounted within said tank below said second filter element support means.

7. A filter according to claim 6 comprising
   an gas outlet port through said tank, and
   a quick connect-disconnect fitting connected between said annular outlet manifold and said gas outlet port.

8. A filter according to claim 4 wherein
   said gas outlet manifold is located externally of said tank and at least partially surrounds said tank.

9. A filter according to claim 8 comprising an annular cleaning gas inlet manifold mounted to said tank, means connecting said cleaning gas inlet manifold to the interiors of said filter elements suspended from said second filter element support means, and said annular cleaning gas inlet manifold is located externally of said tank and at least partially surrounds said tank.

10. A filter according to claim 1, comprising an annular cleaning gas inlet manifold mounted to said tank, and means connecting said cleaning gas inlet manifold to the interiors of said filter elements suspended from said second filter element support means.

11. A filter according to claim 10 wherein said annular cleaning gas inlet manifold is located externally of said tank and at least partially surrounds said tank.

12. A filter according to claim 1 wherein said second filter element support means comprises a first support member from which a plurality of said filter elements are suspended, a cover member sealably mounted over the top of said first support member, and a gas outlet chamber defined by said first support member and said cover member, said gas outlet chamber being connected to the interiors of said filter elements supported by said second filter element support means.

13. A pressure filter according to claim 1 wherein said upper surfaces slope downwardly toward the side wall of said tank.

* * * * *